Feb. 12, 1924. 1,483,479

B. PLATSCHICK

ARTIFICIAL TOOTH

Filed Feb. 21, 1923

Inventor
B. Platschick
Marks & Clerk
Atty's

Patented Feb. 12, 1924.

1,483,479

UNITED STATES PATENT OFFICE.

BENVENUTO PLATSCHICK, OF PARIS, FRANCE.

ARTIFICIAL TOOTH.

Application filed February 21, 1923. Serial No. 620,513.

*To all whom it may concern:*

Be it known that I, BENVENUTO PLATSCHICK, a subject of the Kingdom of Italy, and residing at Paris, Seine Department, No. 12 Rue du Havre, in the Republic of France, manufacturer, have invented certain new and useful Artificial Teeth, of which the following is a specification.

Artificial teeth are usually provided with cramps or connecting pieces in platinum or other metal adapted to support the high temperatures which are required for the baking of the porcelain used as the material for the teeth of a mineral nature. The said cramps are disposed in the paste before the baking of the teeth and are held in place by reason of the transformation of the paste by the high temperature. In some cases, instead of securing the cramps directly in the porcelain, a metal ring is disposed in the paste before baking and is held by the cramps as above stated. The cramps may be made of any suitable metal or of an alloy of nickel, gold-plated or not, and is brazed to the ring by a silver solder.

The present invention relates chiefly to teeth with brazed cramps or connecting pieces and has for its subject various improvements in these teeth.

In the paste of a tooth according to this invention are disposed before the backing the rings or like attaching members in platinum or other metal capable of supporting the high temperatures required for the backing of said paste. The cramps or connectors in platinum, or alloy of precious metals (gold, platinum, palladium) whose melting point is near that of platinum, are brazed with gold which may even be 100% pure. Inasmuch as the cramp is of platinum or an alloy having a like melting point, said tooth can be used for all classes of dental work, comprising gold cast under pressure or work which is termed continuous gum work.

Furthermore, in all artificial teeth wherein gold is employed, the mineral teeth are secured to the base plate by means of gold brazing of various composition. To secure the mineral teeth to the base plate, it is required to cover the rear surface of the tooth with a plate which is perforated at the requisite points and has the said cramps extending through the same, thus forming a veritable covering for the said surface. But the strength of the tooth which is thus faced will chiefly depend upon the greater or less adaptation of the plate to the porcelain. It has been hitherto a difficult matter to obtain an exact adaptation, for in spite of the most careful work, it is impossible to secure the proper fitting of the metal upon the porcelain surface, as the latter in all classes of manufactured teeth is observed to possess a rough surface with projections and cavities.

During the brazing process, the brazing metal and the borax used for the melting will enter the holes provided for the cramps, and cracking is often observed after cooling. Should this not take place, the plate which is imperfectly fitted upon the porcelain will leave a free space between said plate and the porcelain, which will allow particles of food to enter such spaces, and it becomes impossible to secure the cleanliness which is required in the case of artificial teeth.

Furthermore, if the plate could be exactly fitted upon the porcelain, there could be no portion of the cramp left free between the plate and the rear surface of the porcelain; but if the plate is imperfectly fitted, a portion of the same will be left free between the inner side of the plate and the back of the porcelain piece, and this part, under the effort of the opposite teeth, will be subject to bending an incalculable number of times during the movement of the jaws, and will break much more rapidly than if the plate were exactly fitted upon the porcelain and if there were so to speak no breach of continuity between the two parts.

According to my invention, an exact fitting is obtained, inasmuch as after the mounting of the said ring and the baking of the porcelain, each tooth is ground off so as to afford a perfectly plane surface, and it is only after this operation that the cramp or connector is baked to the ring. The facing plate of gold, which is also plane, can therefore be fitted exactly upon the surface of the porcelain by reason of the small stress which is exerted during the operation of bending and riveting the cramps or connectors.

The following description, together with the accompanying drawing which is given by way of example, relates to a tooth which is constructed according to this invention, as well as to a tooth of known manufacture.

Figure 1:
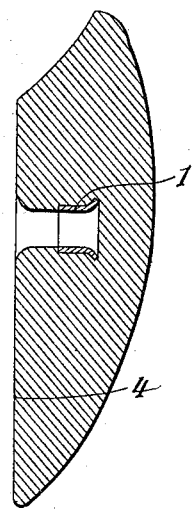
Fig. 1 shows in vertical section a tooth with its ring before the cramp is brazed.

1 indicates the ring which is secured to the tooth 2 during the baking of the porcelain. The cramp or connecting member is brazed to the ring 1 by means of the gold portion 3.

According to this invention, the surface 4 of the tooth is carefully ground off before placing the cramp in position, so as to be perfectly plane and to fit exactly upon the plate 5 which is brazed at 6 to the cramp.

Figure 2:
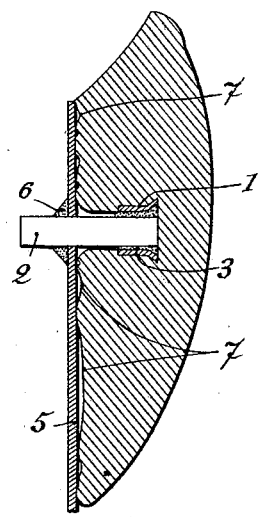
Fig. 2 shows a tooth of the ordinary or non-ground type which is provided with a cramp and a facing plate.
Figure 3:
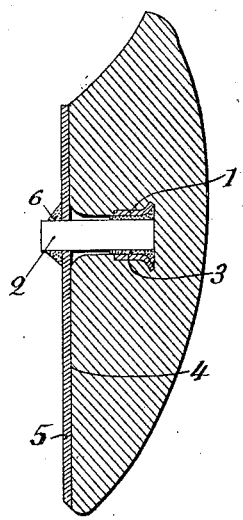
Fig. 3 shows a ground tooth according to the invention which is also provided with a cramp and a facing plate.
Figure 4:
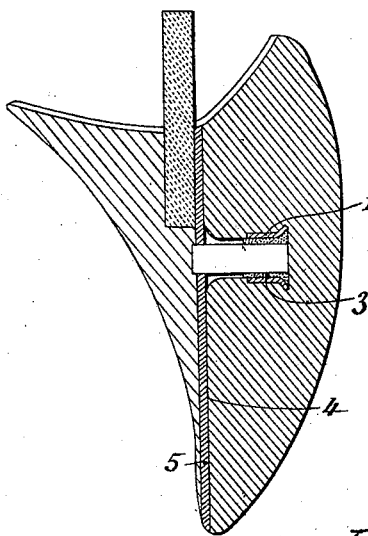
Fig. 4 shows a similar tooth with a brazed projection.

It will be observed in Fig. 2 that when the tooth is not ground off, the facing plate will not fit exactly upon the same. During the brazing operation, the borax would infiltrate into the spaces 7 between the said plate and the tooth, and would subsequently occasion the rupture of the tooth. The said spaces and the drawbacks resulting therefrom are now entirely obviated.

I claim:

Process for making an artificial tooth having rings embedded in the porcelain body of the tooth before baking, and anchors soldered to the said rings, characterized by the fact that the back of the tooth is flattened through milling after the rings have been inserted and after baking, but before the anchors are attached.

In testimony that I claim the foregoing as my invention I have signed my name in presence of a subscribing witness.

BENVENUTO PLATSCHICK.

Witness:
MAURICE ROUX.